United States Patent
Müller et al.

(10) Patent No.: US 10,583,744 B2
(45) Date of Patent: Mar. 10, 2020

(54) BRAKING SYSTEM FOR A RAIL VEHICLE

(71) Applicant: KNORR-BREMSE SYSTEME FÜR SCHIENENFAHRZEUGE GMBH, München (DE)

(72) Inventors: Claus Müller, Wolfratshausen (DE); Christoph Tomberger, München (DE); Ulf Friesen, Neubiberg (DE); Achim Vollmer, Taufkirchen (DE)

(73) Assignee: KNORR-BREMSE SYSTEME FÜR SCHIENENFAHRZEUGE GMBH (DE)

(*) Notice: Subject to any disclaimer, the term of this patent is extended or adjusted under 35 U.S.C. 154(b) by 7 days.

(21) Appl. No.: 15/739,434

(22) PCT Filed: Jun. 17, 2016

(86) PCT No.: PCT/EP2016/064055
§ 371 (c)(1),
(2) Date: Dec. 22, 2017

(87) PCT Pub. No.: WO2016/207078
PCT Pub. Date: Dec. 29, 2016

(65) Prior Publication Data
US 2018/0194233 A1 Jul. 12, 2018

(30) Foreign Application Priority Data
Jun. 23, 2015 (DE) .............. 10 2015 110 053

(51) Int. Cl.
*B60L 7/26* (2006.01)
*B60T 8/17* (2006.01)
(Continued)

(52) U.S. Cl.
CPC .............. *B60L 7/26* (2013.01); *B60L 7/18* (2013.01); *B60T 8/1705* (2013.01);
(Continued)

(58) Field of Classification Search
None
See application file for complete search history.

(56) References Cited

U.S. PATENT DOCUMENTS

| 6,905,180 | B2 | 6/2005 | Mayer et al. |
| 7,533,943 | B2 * | 5/2009 | Kahrs .................. B60L 7/26 188/181 A |

(Continued)

FOREIGN PATENT DOCUMENTS

| DE | 19510755 A1 | 10/1996 |
| DE | 19755112 A1 | 6/1998 |

(Continued)

OTHER PUBLICATIONS

Search Report and Written Opinion for International Patent Application No. PCT/EP2016/064055; dated Jan. 17, 2017.

*Primary Examiner* — Richard M Camby
(74) *Attorney, Agent, or Firm* — Barnes & Thornburg LLP (57) ABSTRACT

A braking system for a rail vehicle includes a target value generator for the target value of the overall braking power, a controller for determining at least one manipulated variable value on the basis of the target value and at least one actuator which transmits the manipulated variable value to the at least one braking device. The system at least approximately determines acceleration components of the rail vehicle and determines the actual value of the total braking power from the acceleration components while taking the vehicle speed and the vehicle mass into consideration. The controller is designed to control the manipulated variable value such as to reduce the control deviation between the target value and the determined actual value.

24 Claims, 5 Drawing Sheets

(51) Int. Cl.
*B60T 13/66* (2006.01)
*B60L 7/18* (2006.01)

(52) U.S. Cl.
CPC ......... *B60T 13/662* (2013.01); *B60L 2200/26* (2013.01); *B60L 2260/42* (2013.01)

(56) References Cited

U.S. PATENT DOCUMENTS

| | | | |
|---|---|---|---|
| 9,522,667 B2 | 12/2016 | Herden et al. | |
| 2007/0219682 A1 | 9/2007 | Ajith et al. | |
| 2010/0292875 A1* | 11/2010 | Gross | B60T 8/1705 701/19 |
| 2015/0032302 A1* | 1/2015 | Foerster | B60T 17/228 701/19 |

FOREIGN PATENT DOCUMENTS

| | | |
|---|---|---|
| DE | 19810213 A1 | 9/1999 |
| DE | 10026687 A1 | 12/2001 |
| DE | 102005046017 A1 | 4/2006 |
| DE | 102008034654 A1 | 2/2010 |
| DE | 102011052545 A1 | 2/2013 |
| DE | 102011113086 A1 | 3/2013 |
| DE | 102012219984 A1 | 4/2014 |
| EP | 0932033 A1 | 7/1999 |
| EP | 2741944 A1 | 6/2014 |
| EP | 2890596 B1 | 7/2015 |
| WO | 2013034731 A2 | 3/2013 |

\* cited by examiner

BRAKING SYSTEM FOR A RAIL VEHICLE

PRIORITY CLAIM

This patent application is a U.S. National Phase of International Patent Application No. PCT/EP2016/064055, filed Jun. 17, 2016, which claims priority to German Patent Application No. 10 2015 110 053.3, filed Jun. 23, 2015, the disclosures of which are incorporated herein by reference in their entirety.

FIELD

Disclosed embodiments relate to braking system for a rail vehicle, as well as a device for determining the braking force acting on the vehicle.

BACKGROUND

Rail vehicles must maintain specific braking distances in traffic and, in particular, come to a stop at points signaled to them beforehand. Rail vehicles are braked according to precisely defined criteria, inter alia deceleration characteristics, the observance of which is relevant to ensuring economic and safe operation of the rail vehicles. Various types of brakes are involved in each braking operation of a modern rail vehicle (friction brake, electrodynamic brake, electromagnetic rail brake and eddy current brake). Each of these brakes has its specific advantages, such as a speed or performance range, in which it functions most effectively or most economically with regard to wear. Each brake type has in this case specific tolerances and imprecisions in applying the braking force which leads to undesirable variations in the braking force achieved over the course of the braking process.

SUMMARY

Disclosed embodiments provide a device for determining the braking force acting on a vehicle. Additionally, a braking system is provided for a vehicle by means of which the vehicle can be brought to a stop more precisely on a specific route or at a specific location than according to the previous prior art.

In accordance with at least one embodiment, a device was developed for determining the braking force acting on a vehicle, i.e., a type of braking force estimator. This comprises means for detecting acceleration components.

In the following, the subject matter of the disclosed embodiments will be explained with reference to figures, without thereby restricting the subject matter of the disclosed embodiments. In the figures.

DETAILED DESCRIPTION

In accordance with at least one embodiment, additional means can be provided for detecting the longitudinal deceleration acting on the vehicle as well as the downhill force. In addition, an evaluation unit is provided that may determine the braking force based on the vehicle longitudinal deceleration and the downhill force.

The vehicle longitudinal deceleration may be the kinematic deceleration along the vehicle longitudinal axis. The vehicle longitudinal axis is always parallel to the track, i.e., it angles with the track in a transition into an ascending gradient or a descending gradient.

The downhill force is that force that acts in the direction of travel on the vehicle from the plane (ascending gradient or descending gradient) when the track is sloped. The weight of the vehicle directed vertically downward in the Earth's gravitational field can be calculated as a vector sum of this downhill force and a normal force perpendicular to the track exerted by the vehicle on the track.

It has been recognized that the downhill force is a variable that substantially influences the dynamics of braking processes and simultaneously always changes over the course of the route. The routine gradients in the field of rail vehicles can for example be 40 per thousand in Germany for high-speed traffic, and even higher for branch lines. On ascending gradients, the downhill force of the direction of travel is in the opposite direction and supports the effect of braking; on descending gradients, the downhill force runs in the direction of travel and counteracts the effect of braking. It is therefore necessary to take into account the downhill force to be able to deduce the braking force with sufficient precision from the vehicle longitudinal deceleration.

In regulating deceleration according to the prior art, the effect of downhill force is not taken into account separately. Consequently, the braking distance is always the same length independently of whether the track runs in the plane, on the ascending gradient or descending gradient. On the ascending gradient, the downhill force that supports the braking effect is therefore disadvantageously neutralized since the braking is not as strong. Conversely on the descending gradient, the downhill force that is disadvantageous for the braking effect is implicitly compensated by greater application of the brake.

These problems no longer arise in the solution according to the disclosed embodiments. The operability of the brake is significantly improved. From the perspective of the driver, the vehicle behaves in an intuitively correct manner on ascending and descending gradients to the extent that the braking distance is shorter on the ascending gradient and longer on the descending gradient; in certain countries and markets, the distant signal distances are also configured for this in the infrastructure of rail vehicles. Overall, the brake control behaves in a more linear manner which is advantageous for overlapping speed controls. At the same time, this ensures that the maximum permissible traction utilization is not exceeded in the event of high deceleration values.

Means for detecting the longitudinal gradient of the route at the given location of the rail vehicle are advantageously provided to detect the downhill force. In particular, the means for detecting the acceleration components can be integrated in a common component with the means for detecting the downhill force. This component can for example comprise two acceleration sensors arranged orthogonal to each other.

Within the context of the disclosed embodiments, a braking system was developed for a rail vehicle. This comprises a setpoint generator for the setpoint of the overall braking force, a controller for determining at least one manipulated variable based on this setpoint, and at least one actuator that transmits this manipulated variable to at least one braking device.

In so doing, the setpoint generator can directly specify the setpoint of the overall braking force. However, a required vehicle longitudinal deceleration can also be specified, for example. The necessary overall braking force can be determined from the vehicle longitudinal deceleration, the running speed and the vehicle mass. The vehicle longitudinal deceleration is a more informative variable than the overall braking force for the vehicle driver who must brake the vehicle precisely at a given point.

If there are a plurality of braking devices, a braking force distributor is thus advantageously provided to control the necessary individual braking forces of the different braking systems. This braking force distributor can then particularly take into account which braking device acts most effectively in which speed range or performance range, or most economically with regard to wear. In particular, a plurality of actuators can then be provided that transmit different manipulated variables to different braking devices.

In accordance with at least one embodiment, means for at least approximately determining acceleration components of the rail vehicle as well as means for determining the actual value of the overall braking force from these acceleration components taking into account the running speed and vehicle mass are provided. The controller is designed to influence the manipulated variable to reduce the control deviation between the setpoint and the determined actual value. In so doing, the vehicle mass can be fixed; however, means can also be provided for detecting the mass of the rail vehicle which in particular can be integrated in a secondary suspension arranged between the body and the wheels of the vehicle.

By means of the measures provided according to the disclosed embodiments, in particular when using the braking force estimator, the control quality for achieving the specified setpoint is improved, i.e. the setpoint is reached faster and more precisely than according to the prior art. Advantageously, no detailed knowledge of the brakes that are used is required for this. All of the tolerances and imprecisions contained in the functional chain of the brake between the setpoint specification to the application of the braking force can be determined and compensated independently of the strategy used to distribute the braking forces to the different brakes (blending). The reproduction precision of the braking distances as well as the maintenance of specified braking forces and decelerations resulting therefrom are advantageously greater in comparison to the previous prior art.

In accordance with at least one embodiment, the means for determining acceleration components may comprise a first accelerometer for determining a measured value. Alternatively or in combination therewith, these means can also be designed to determine the longitudinal deceleration as a time derivative of the running speed and to remove the effect of downhill force from this longitudinal deceleration. Particularly advantageously, the means for determining acceleration components can comprise an additional comparison unit that is designed to plausiblize the measured value and the time derivative of the running speed with the effect of downhill force removed relative to each other before determining the actual value.

In accordance with at least one embodiment, the actuator is pilot-controlled with a manipulated variable determined directly from the setpoint of the braking force without taking into account the actual value of the braking force, and it transmits a superposition of this manipulated variable with the manipulated variable determined by the controller to at least one braking device. With this pilot control, the braking force can at least be brought close to the setpoint so that the controller only has to compensate a difference. This is feasible faster and with improved control quality than finding the optimum manipulated variable without pilot control. The pilot control improves the control quality by using prior knowledge of the relationship between manipulated variable and exerted braking force. In addition, even when the controller fails, the pilot control makes it possible to improve the setpoint specification over, for example, applying a fixed default value.

The control quality can be further improved in another embodiment by the controller receiving at least one environmental variable as feedback for the controlling in addition to the actual value. Such environmental variables can for example be the temperature or humidity in the environment of the rail vehicle. For example, when the value of the manipulated variable transmitted to the braking device is the same, the braking force that this generates can depend on such environmental conditions. In this context, the controller can in particular be configured to determine, from a series of values for the actual value on the one hand and the environmental variable on the other hand, a functional relationship between these two variables. The controller can then improve its control quality in a self-learning manner, for example with the assistance of a neural network.

In accordance with at least one embodiment, a second accelerometer is provided for determining the downhill force and/or the line longitudinal gradient, wherein the measuring devices of both accelerometers are orthogonal to each other. The influence of the line-gradient-dependent downhill force can then be particularly easily separated from the vehicle longitudinal deceleration. For system-related reasons, a first accelerometer arranged in the vehicle longitudinal direction does not provide any signal components that depict the downhill force corresponding to the longitudinal gradient of the route.

Moreover, when determining the actual value ($F_{Br,est}$), the controller can advantageously take into account one or more of the forces acting on the rail vehicle (2) that result from air resistance, rolling resistance and/or other resistances.

The control with feedback of the actual value can be provided for all brakes. However, it can also be provided only for a subset of the effective brakes. The controller then controls the remaining brakes depending on the setpoint without taking into account the actual value, and/or it does not affect these brakes at all; instead, these brakes are only controlled by the pilot control while circumventing the controller. In particular, the braking systems used in rail vehicles have significantly different transmission functions that form the respective manipulated variable for the generated braking force. The control quality can be improved when only those brakes are included in the closed control loop whose transmission functions are advantageous in terms of control. In particular, changes in the manipulated variable by the controller may not excite any residual oscillations in the control loop. Advantageously, those brakes may, therefore, be used for the control with feedback of the actual value whose braking force is linearly dependent on the manipulated variable with which they are controlled and that have the smallest possible rise time constant.

In accordance with at least one embodiment, the controller takes into account a prior history of deviations between the setpoint and actual value of the braking force from previous braking procedures when determining the manipulated variable. Accordingly, for example, to optimize the static transmission behavior from deviations between the actual value and setpoint of the braking force, an additive correction can be calculated for the manipulated variable, with which the desired stationary state of the braking force can be adjusted faster and with fewer changes to the manipulated variable in future braking procedures. This means that the controller is automatically adapted to the controlled system, and an optimum control behavior can thus be achieved. Advantageously, during a change to the setpoint, and optionally also during the reaction of the manipulated variable to this change, no deviations between the actual value and setpoint are included in the prior history so as not to influence the dynamic transmission behavior of the brake control.

Advantageously, the feedback of the actual value to the controller can increase or lower the braking force by an amount limited and adjustable in the positive and/or negative direction. One simple embodiment is for example to increase the amount of the feedback value only by a value≥0 and not however to lower it. This ensures that, on the one hand, if the feedback ceases or fails, a hazardous reduction of the braking force or extension of the braking distance cannot occur and, on the other hand, excessive braking force is not requested that exceeds the permissible limits (maximum force, use of friction, etc.). To this end, for example, the part of the controller responsible for the rudimentary control of the manipulated variable depending only on the setpoint (open-loop without feedback) and the part of the controller responsible for reducing the control deviation between the setpoint and actual value (closed-loop with feedback) can be designed as separate components. A pilot control circumventing the controller can also ensure operating safety in the event that the controller fails.

To reduce unanticipated side effects caused by the feedback of the actual value, this consideration advantageously occurs under the boundary condition that the absolute value of the change to the setpoint caused thereby is limited to a given value. This value is advantageously chosen to not exceed that which is at least necessary to correct the variation in the static transmission behavior (system gain) of the control loop.

The braking system is designed for braking a rail vehicle. In accordance with at least one embodiment, it comprises at least two different brakes from the group of friction brake, electrodynamic brake, electromagnetic rail brake, eddy current brake, retarder or the like. Each of these brakes has its specific advantages, such as a speed or performance range, in which it functions most effectively or most economically with regard to wear. The required overall braking force is mixed taking into account these criteria from the contributions of the existing individual brakes (blending).

In accordance with at least one embodiment, means for directly or indirectly measuring the braking force of each individual brake may be provided. In addition, a monitoring circuit is provided that compares the sum of these braking forces with the actual value for the braking force supplied by the braking force estimator. From this comparison, the state of the employed brakes can then advantageously be deduced. If for example the use of a certain brake leads to an exceptional deviation in the sum of the individual braking forces from the actual value supplied by the braking force estimator, this can thus be considered as an indication that this brake is defective.

Figure 1:
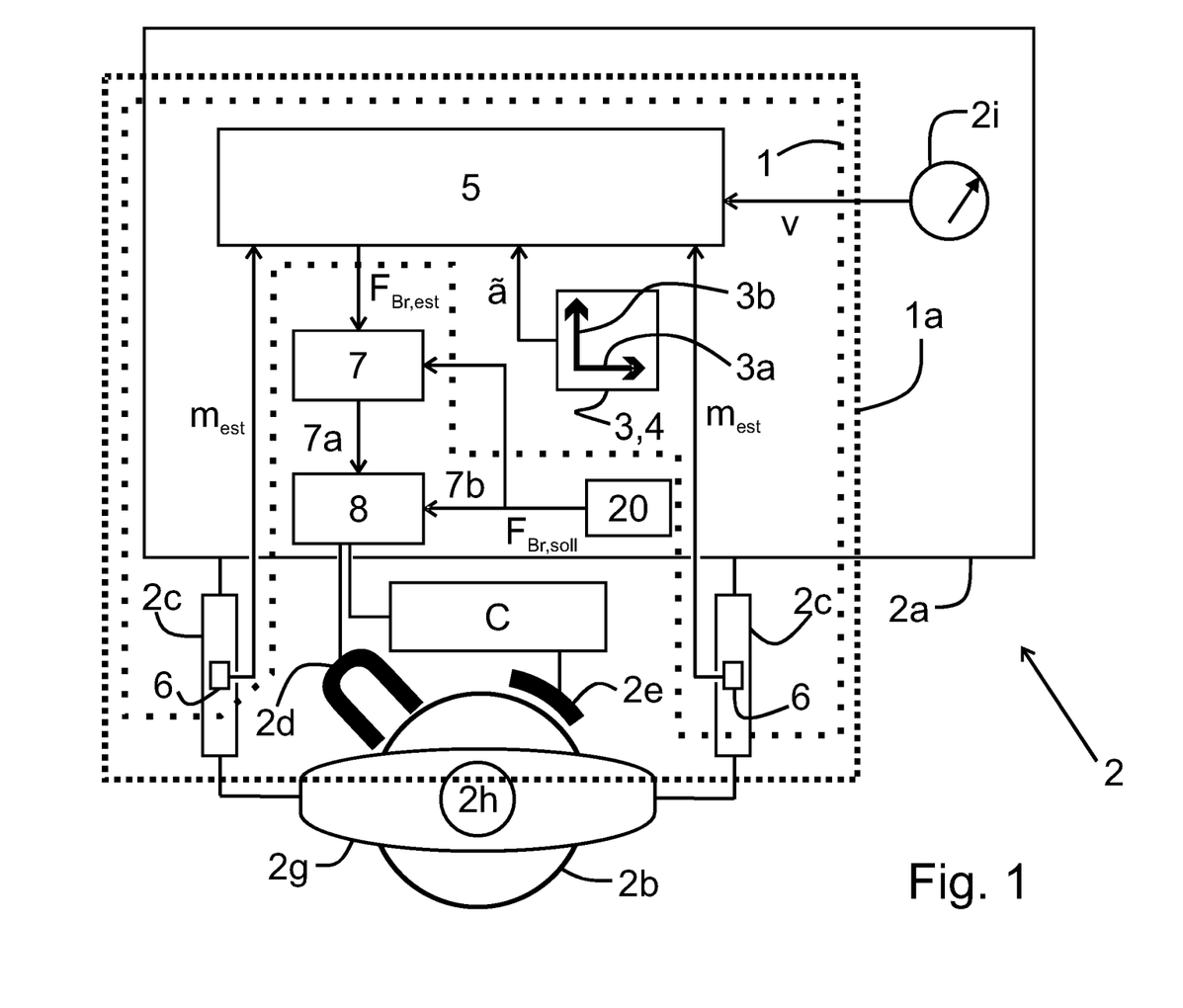
FIG. 1 shows a schematic drawing of a vehicle with a braking system according to disclosed embodiments.

FIG. 1 schematically portrays a rail vehicle 2 that is equipped with a braking system (1a) according to an exemplary embodiment. The rail vehicle 2 comprises a body 2a and travels on wheels 2b, of which only one is shown in FIG. 1 for the sake of clarity. The wheel 2b is mounted via a wheel hub 2h and a primary suspension on a bogie 2g. The bogie 2g is connected via a secondary suspension 2c to the body 2a.

The braking system 1a comprises a friction brake 2e with a brake shoe that is pressed via a brake cylinder C against the wheel 2b. Moreover, an eddy current brake 2d is provided. Both brakes are controlled by a braking force distributor 8 that serves as an actuator in this respect.

The setpoint $F_{Br,soll}$ for the overall braking force is specified by the setpoint generator 20 that for example can be a control element in the cab of the rail vehicle 2. The setpoint $F_{Br,soll}$ is on the one hand supplied directly to the braking force distributor 8 as a pilot control value 7b for the manipulated variable, which is to be applied to the brakes 2d and 2e. On the other hand, the setpoint $F_{Br,soll}$ is also supplied to the controller 7 that generates an additional manipulated variable 7a. Both manipulated variables 7a and 7b are offset with each other in the braking force distributor 8 and output to the brakes 2d and 2e.

As feedback, the controller 7 receives the estimated actual value $F_{Br,est}$ for the overall braking force from the braking force estimator 1 that is integrated in the braking system 1a. This braking force estimator 1 contains a combined accelerometer 3, 4 that has both a first measuring device 3a in the direction of the vehicle longitudinal axis as well as a measuring device 3b orthogonal thereto. The additional measuring device 3b renders the sensor 3, 4 sensitive to the downhill force so that the latter can be taken into account when determining the acceleration components ã. The acceleration components ã are supplied to the evaluation unit 5. The evaluation unit is connected to the tachometer 2i of the rail vehicle and accordingly receives the running speed v as additional input. Moreover, means 6 for determining the mass $m_{est}$ of the rail vehicle 2 are arranged in the secondary suspension 2c and are also connected to the evaluation unit 5. The evaluation unit 5 determines the estimated actual value $F_{Br,est}$ for the overall braking force from the acceleration components ã taking into account the mass $m_{est}$ and the running speed v. The controller 7 is designed to determine an optimum value for the additional manipulated variable 7a to minimize the difference between the setpoint $F_{Br,soll}$ and the actual value $F_{Br,est}$ for the overall braking force.

Figure 2A:
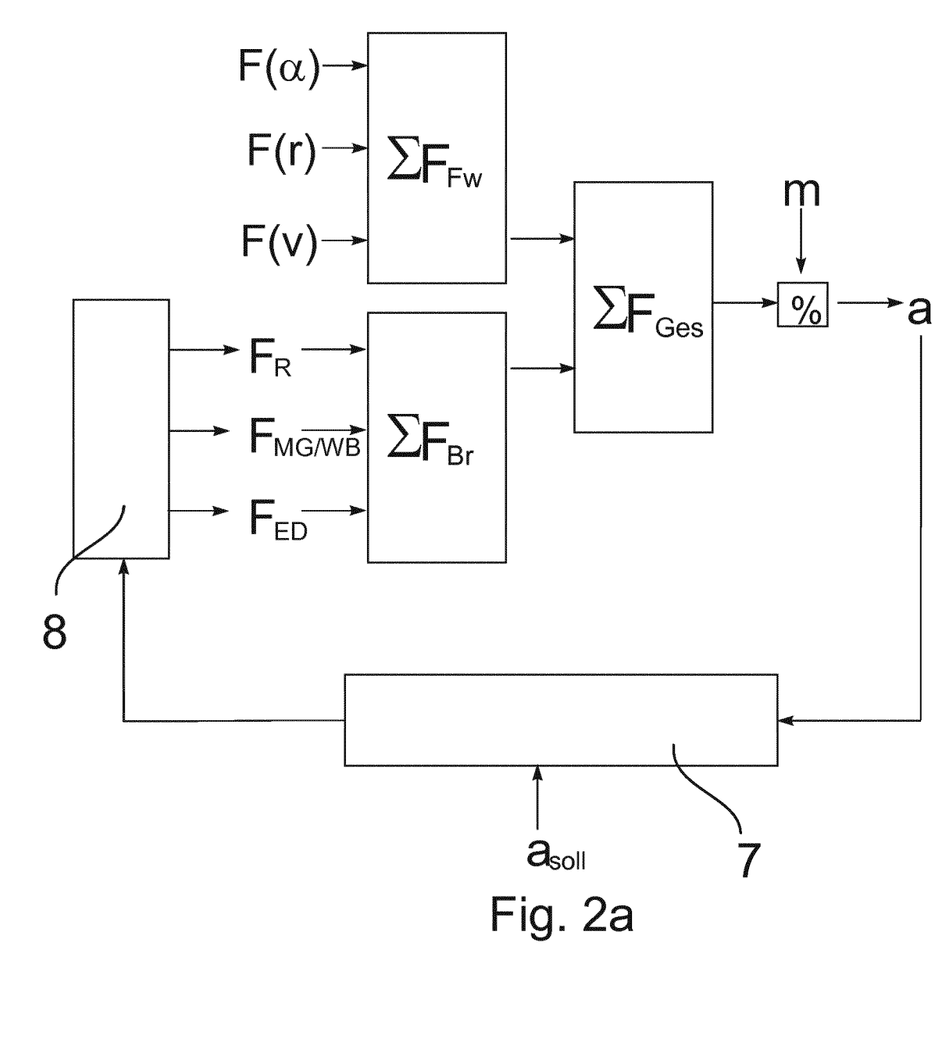
FIG. 2 shows a comparison between deceleration control according to the prior art (a) and braking force control according to the disclosed embodiments (b).
Figure 2B:
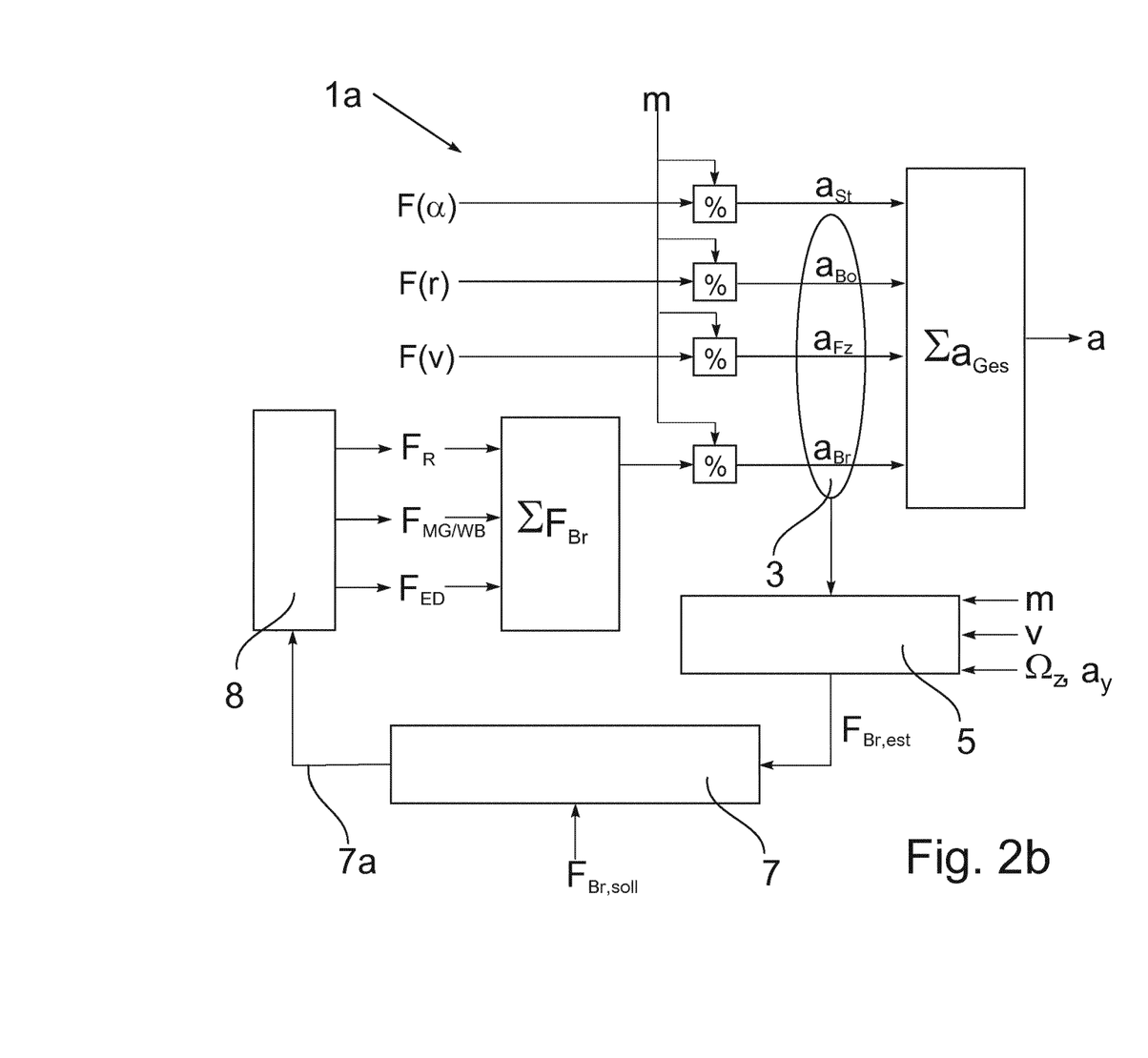

FIG. 2 shows a comparison of the deceleration control according to the prior art (FIG. 2a) with the braking force control according to a disclosed embodiment (FIG. 2b) with the example of a rail vehicle. Vehicle resistance forces $F_{Fw}$ on the one hand and braking forces $F_{Br}$ on the other hand act on the vehicle. The vehicle resistance forces comprise the ascending gradient resistance $F(\alpha)$, curve resistance $F(r)$ and other vehicle and traction resistances $F(v)$, such as rolling or aerodynamic resistances. The braking forces are composed of the component $F_R$ of a friction brake, the component $F_{MG/WB}$ of an electromagnetic rail brake or an eddy current brake, and the component $F_{ED}$ of an electrodynamic brake.

In the deceleration control model (FIG. 2a), all of the forces add up to an overall force $F_{ges}$ which yields the resulting kinematic deceleration a (dv/dt) together with the vehicle mass m. A controller 7 receives both the actual value a as well as the setpoint $a_{soll}$ for this deceleration. It sends manipulated variables to a braking force distributor 8 so that the actual value of the deceleration is brought into correspondence with the setpoint. A change in the gradient resistance from switching to an ascending gradient or a descending gradient is compensated by the controller 7 with the above-described disadvantageous side effects.

In the braking force control model (FIG. 2b) according to an exemplary embodiment of the braking system (1a)

according to a disclosed embodiment, gradient resistance F(α), curve resistance F(r) and vehicle and traction resistance F(v) together with the vehicle mass m each produce acceleration components $a_{st}$, $a_{Bo}$ and $a_{Fz}$. Analogously, the sum of all braking forces $F_{Br}$ leads to a deceleration $a_{Br}$. All of the effective acceleration components $a_{st}$, $a_{Bo}$, $a_{Fz}$ and $a_{Br}$ add up to an overall deceleration $_{ges}$=a. The sensor 3 acting in the direction of travel for the vehicle longitudinal deceleration which is part of the braking force estimator 1 according to a disclosed embodiment only provides the sum of the deceleration components $a_{Bo}$, $a_{FZ}$ and $a_{Br}$; the gradient deceleration $a_{st}$ is generally not detected by the sensor 3. The recorded deceleration components are sent to the evaluation unit 5 of the braking force estimator that also receives the vehicle mass m, the current running speed v as well as the yaw rate (rate of rotation about the vertical axis) $\Omega_z$ and the transverse acceleration $a_y$ as inputs. From this, the evaluation unit 5 calculates the estimated braking force $F_{Br,est}$. This is supplied to the controller 7 together with a setpoint $F_{Br,soll}$. By adapting the manipulated variable 7a, the controller 7 adjusts the braking forces so that the actual value $F_{Br,est}$ for the braking force supplied by the evaluation unit 5 is brought into correspondence with the setpoint $_{Br,soll}$.

A terrain-related change in the gradient resistance is not considered in this control loop. The vehicle behaves in an intuitively correct manner so that the braking distance becomes shorter on the ascending gradient and longer on the descending gradient without further intervention. This can be compensated by the vehicle driver (or another control loop) by adapting the setpoint $F_{Br,soll}$ for the braking force.

Figure 3:
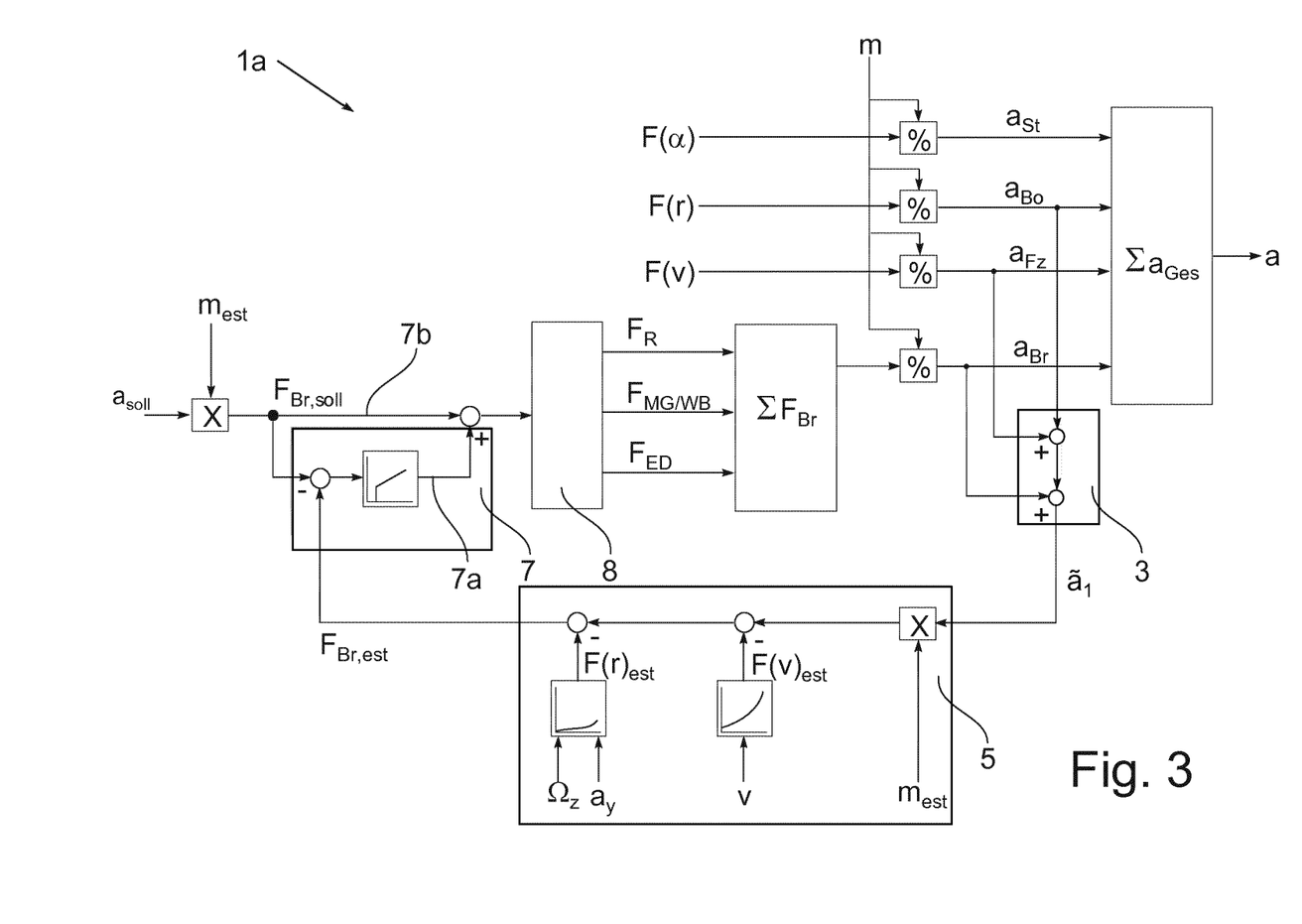
FIG. 3 shows a detailed drawing of the signal flow for braking force control.

FIG. 3 shows a detailed drawing of the signal flow for controlling the braking force. It is based on FIG. 2b. The details of the evaluation unit 5 are explained with reference to FIG. 2b. The evaluation unit 5 receives the sum $\tilde{a}_1=\tilde{a}_{mess}$ of the deceleration components $a_{Bo}$, $a_{FZ}$ and $a_{Br}$ supplied by the sensor 3. Dividing by the vehicle mass m yields the overall force that was the cause of the deceleration $\tilde{a}$. From the running speed v, only an estimated value $F(v)_{est}$ is formed for the vehicle and traction resistance and subtracted from the overall force. Then an estimated value $F(r)_{est}$ for the curve resistance is formed from the yaw rate (rate of rotation about the vertical axis) $\Omega_z$ and the transverse acceleration $a_y$, and is also subtracted. The final result supplied by the evaluation unit 5 is an estimated value $F_{Br,est}$ of the braking force. This estimated value is supplied to the controller 7 as an actual value of the braking force. Based on the difference between this actual value $F_{Br,est}$ and the setpoint $F_{Br,soll}$, the controller 7 corrects the manipulated variables 7a which are supplied to the employed brakes with the aim of bringing the actual value $F_{Br,est}$ into correspondence with the setpoint $F_{Br,soll}$.

The braking force distributor 8 that controls the individual brakes and functions as an actuator in this respect is pilot-controlled with a manipulated variable 7b statically determined in this exemplary embodiment from the target deceleration $a_{soll}$ and the vehicle mass $m_{est}$. The manipulated variable 7a determined by the controller is a dynamic correction value that is added to this statically determined value 7b. This is motivated by the consideration that the static pilot control brings the braking force at least close to the setpoint $F_{Br,soll}$. The controller 7 then only has to compensate for the difference. This improves the control quality.

Figure 4:
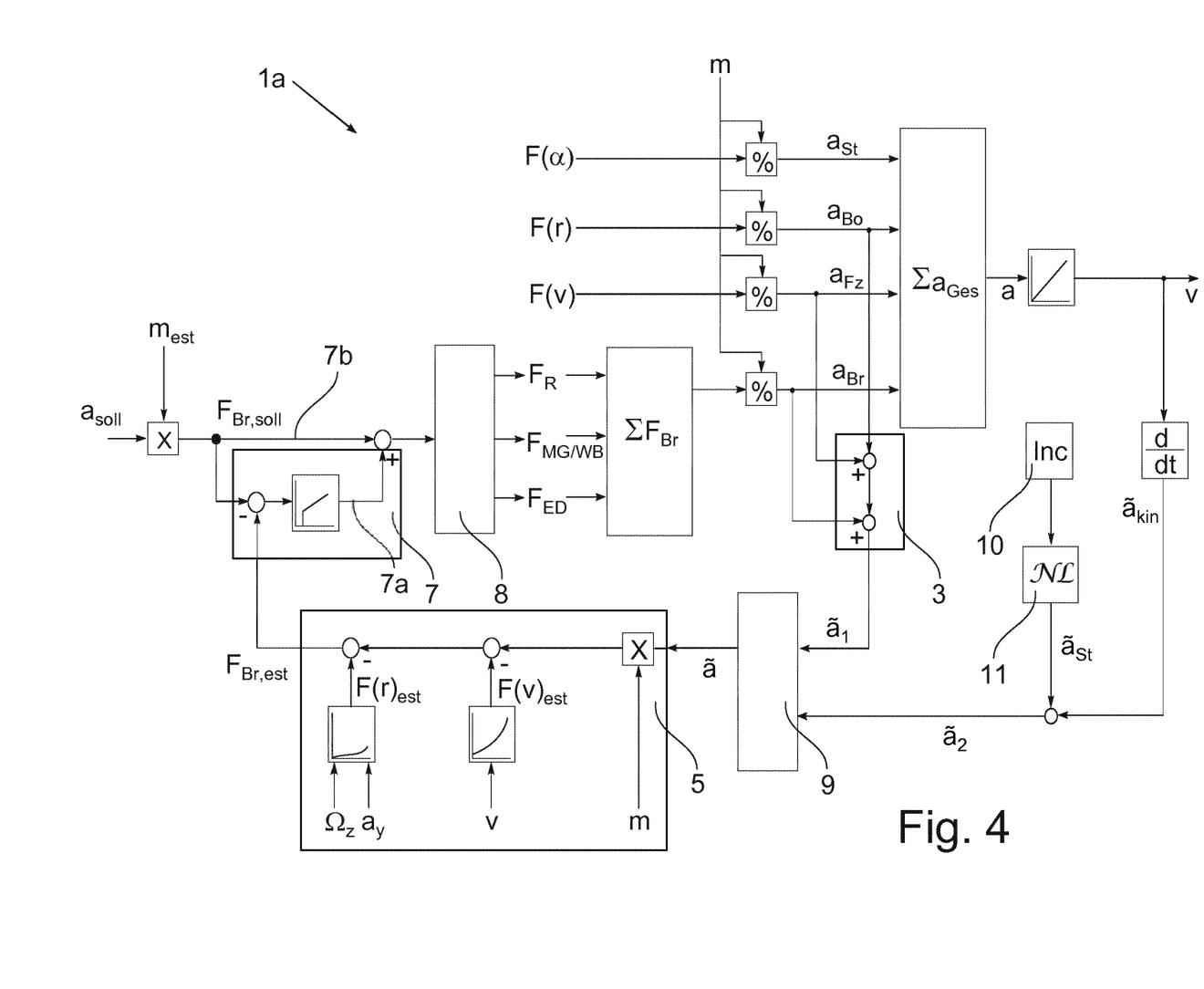
FIG. 4 shows a signal flow in another exemplary embodiment.

FIG. 4 shows the signal flow in another exemplary embodiment. In contrast to FIG. 3, a time derivative of the running speed v is additionally determined in this case as acceleration component $\tilde{a}_{kin}$. By means of sensors (10) and an evaluation (11), the acceleration component $\tilde{a}_{st}$ that results from the downhill force is determined at the same time thereto. The acceleration component $\tilde{a}_{st}$ that results from the downhill force is removed from the longitudinal deceleration $\tilde{a}_{kin}$ determined as a derivative of the running speed v. The result is supplied as acceleration value $\tilde{a}_2$ to the comparison unit 9. This comparison unit 9 also receives the acceleration value $\tilde{a}_1=\tilde{a}_{mess}$ which combines the components $a_{Bo}$, $a_{Fz}$ and $a_{Br}$. Following the plausibilization of the two acceleration values $\tilde{a}_1$ and $\tilde{a}_2$, value $\tilde{a}$, such as an average, composed therefrom is forwarded to the evaluation unit 5.

Precisely metering a braking operation would require feedback of the actually exerted braking force by communicating the feedback for example to the driver on a display in the cab, or directly supplying the feedback to an electronic control loop for the braking force. Particularly when several types of brakes are interacting simultaneously, the braking force exerted by each individual brake cannot, however, be measured directly, rather only circuitously with corresponding imprecisions, such as by the consumed electrical output, by a brake cylinder pressure or material strains. The physical relationship between these variables and the braking force is frequently nonlinear and is moreover subject to systematic and random fluctuations. A solution for directly recording the exerted braking force just for the pneumatic friction brake is known from DE 10 2012 219 984 A1.

From DE 10 2011 052 545 A1, it is known to evaluate signals that are representative of the longitudinal deceleration of the vehicle, and to seek a given value for the longitudinal deceleration through a control loop. Disadvantageously, this evaluation does not supply the actually effective braking force. Moreover, a side-effect of the controlling to a setpoint for the longitudinal deceleration is that the possible deceleration on an ascending gradient is not exhausted, and that the brake is overstressed on a descending gradient.

REFERENCE NUMBER LIST

1 Braking force estimator
1a Braking system
2 Rail vehicle
2a Body of the rail vehicle 2
2b Wheel of the rail vehicle 2
2c Secondary suspension between bogie 2g and body 2a
2d Eddy current brake
2e Friction brake
2g Bogie
2h Wheel hub
2i Tachometer
3 Accelerometer
3a, 3b Measuring devices of the accelerometer 3
4 Means for determining the downhill force
5 Evaluation unit of the braking force estimator 1
6 Sensor for determining the vehicle mass $m_{est}$
7 Controller
7a Manipulated variable generated by the controller 7
7b Pilot control value for the manipulated variable determined from the setpoint $F_{Br,soll}$
8 Braking force distributor as actuator
9 Comparison unit
10, 11 Removal of the downhill force from the kinematic deceleration $\tilde{a}_{kin}$
20 Setpoint generator
$\tilde{a}$, $\tilde{a}_1$, $\tilde{a}_2$ Acceleration components
$\tilde{a}_{kin}$ Time derivative of the running speed v
$\tilde{a}_{mess}$ Measured value of the accelerometer 3, 4

$F_{Br,est}$ Estimated actual value of the overall braking force
$F_{Br,soll}$ Setpoint for the overall braking force
m Vehicle mass
$m_{est}$ Estimated value of the vehicle mass m
v Running speed

The invention claimed is:

1. A braking system for a rail vehicle, the braking system comprising:
a setpoint generator for the setpoint of the overall braking force;
a controller for determining at least one manipulated variable based on this setpoint;
at least one actuator that transmits the at least one manipulated variable to at least one braking device;
means for at least approximately determining acceleration components of the rail vehicle; and
means for determining an actual value of the overall braking force based on the acceleration components taking into account the running speed and vehicle mass,
wherein the controller is designed to control the manipulated variable to reduce the control deviation between the setpoint and the determined actual overall braking force value,
wherein the means for determining acceleration components comprise a first accelerometer for determining a measured value, and
wherein the means for determining the actual overall braking force value comprises a comparison unit that is designed to average the measured value and the time derivative of the running speed with the effect of downhill force removed before determining the actual overall braking force value.

2. The braking system of claim 1, wherein the means for determining acceleration components are designed to determine the longitudinal deceleration of the rail vehicle as a time derivative of the running speed and to remove the effect of downhill force.

3. The braking system of claim 1 wherein the actuator is pilot-controlled with a manipulated variable determined directly from the setpoint without taking into account the actual overall braking force value, and transmits a superposition of this manipulated variable with the manipulated variable determined by the controller to at least one braking device.

4. The braking system of claim 1 wherein the controller receives at least one environmental variable as feedback for the controlling in addition to the actual overall braking force value.

5. The braking system of claim 4, wherein the controller is configured to determine, based on a series of values for the actual overall braking force value and the environmental variable, a functional relationship between.

6. The braking system of claim 1, wherein a second accelerometer is provided for determining the downhill force and/or the line longitudinal gradient, wherein the measuring devices of both accelerometers are orthogonal to each other.

7. The braking system of claim 1, wherein the control with feedback of the actual overall braking force value is provided only for a subset of the effective brakes.

8. The braking system of claim 1, by a controller that takes into account a prior history of deviations between the setpoint and actual overall braking force value of the braking force from previous braking procedures when determining the manipulated variable.

9. The braking system of claim 1, the feedback of the actual overall braking force value to the controller can increase or lower the braking force by an amount limited and adjustable in the positive and/or negative direction.

10. A device for determining the actual value of the braking force acting on a rail vehicle, the device comprising:
means for detecting acceleration components of the vehicle longitudinal deceleration;
means for detecting the downhill force acting on the vehicle; and
an evaluation unit that determines the braking force based on the vehicle longitudinal deceleration and the downhill force,
wherein the means for detecting acceleration components comprise a first accelerometer for determining a measured value, and
wherein the evaluation unit that determines the braking force value comprises a comparison unit that is designed to average the measured value and the time derivative of the running speed with the effect of downhill force removed before determining the actual overall braking force value.

11. The braking system of claim 1, further comprising means for detecting the longitudinal gradient of the route at the given location of the rail vehicle to detect the downhill force.

12. The braking system of claim 1, wherein the means for detecting the vehicle longitudinal deceleration are integrated in a common component with the means for detecting the downhill force.

13. The braking system of claim 1, wherein the means for determining the actual overall braking force value are designed to take into account one or more of the forces acting on the rail vehicle that result from air resistance, rolling resistance and/or other resistances when determining the actual overall braking force value.

14. The braking system of claim 1, further comprising means for detecting the mass of the rail vehicle.

15. The braking system of claim 14, wherein the means for detecting the mass are integrated in a secondary suspension arranged between the body and the wheels of the rail vehicle.

16. The braking system of claim 10, further comprising at least two different brakes of a group comprising friction brake, electrodynamic brake, electromagnetic rail brake, eddy current brake and retarder.

17. The braking system of claim 10, further comprising means for directly or indirectly measuring the braking force of each individual brake a monitoring circuit is provided that compares the sum of these braking forces with the actual value for the breaking force.

18. The braking device of claim 10, further comprising means for detecting the longitudinal gradient of the route at the given location of the rail vehicle to detect the downhill force.

19. The braking device of claim 10, wherein the means for detecting the vehicle longitudinal deceleration are integrated in a common component with the means for detecting the downhill force.

20. The braking device of claim 10, wherein the means for determining the actual overall braking force value are designed to take into account one or more of the forces acting on the rail vehicle that result from air resistance, rolling resistance and/or other resistances when determining the actual overall braking force value.

21. The braking device of claim 10, further comprising means for detecting the mass of the rail vehicle.

22. The braking system of claim 21, wherein the means for detecting the mass are integrated in a secondary suspension arranged between the body and the wheels of the rail vehicle.

23. The braking device of claim 10, further comprising at least two different brakes of a group comprising friction brake, electrodynamic brake, electromagnetic rail brake, eddy current brake and retarder.

24. The braking device of claim 10, further comprising means for directly or indirectly measuring the braking force of each individual brake a monitoring circuit is provided that compares the sum of these braking forces with the actual value for the breaking force.

* * * * *